(12) United States Patent
Al-Mousa

(10) Patent No.: US 11,601,446 B2
(45) Date of Patent: Mar. 7, 2023

(54) METHOD TO DETECT DATABASE MANAGEMENT SYSTEM SQL CODE ANOMALIES

(71) Applicant: Saudi Arabian Oil Company, Dhahran (SA)

(72) Inventor: Emad Mohammad Al-Mousa, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 260 days.

(21) Appl. No.: 16/998,846

(22) Filed: Aug. 20, 2020

(65) Prior Publication Data

US 2022/0060486 A1 Feb. 24, 2022

(51) Int. Cl.
| | |
|---|---|
| *H04L 29/06* | (2006.01) |
| *G06F 16/2455* | (2019.01) |
| *G06F 16/23* | (2019.01) |
| *G06F 16/22* | (2019.01) |
| *H04L 9/40* | (2022.01) |

(52) U.S. Cl.
CPC ...... *H04L 63/1416* (2013.01); *G06F 16/2255* (2019.01); *G06F 16/2379* (2019.01); *G06F 16/24558* (2019.01); *H04L 63/02* (2013.01); *H04L 63/1425* (2013.01)

(58) Field of Classification Search
CPC . H04L 63/1416; H04L 63/02; H04L 63/1425; G06F 16/24558; G06F 16/2379; G06F 16/2255
See application file for complete search history.

(56) References Cited

U.S. PATENT DOCUMENTS

| | | | |
|---|---|---|---|
| 7,343,377 B1* | 3/2008 | van Opdorp | ........ G06F 16/2365 707/999.102 |
| 7,845,009 B2 | 11/2010 | Grobman | |
| 7,958,256 B2 | 6/2011 | Keeler | |
| 8,281,393 B2 | 10/2012 | Sallam | |
| 8,464,345 B2 | 6/2013 | Satish et al. | |

(Continued)

OTHER PUBLICATIONS

Dasgupta et al., "Techniques for validation and controlled execution of processes, codes and data: a survey," in the Proceedings of the 2010 International Conference on Security and Cryptography, Jul. 2010, 9 pages.

(Continued)

*Primary Examiner* — Kambiz Zand
*Assistant Examiner* — Afaq Ali
(74) *Attorney, Agent, or Firm* — Fish & Richardson P.C.

(57) ABSTRACT

The present disclosure describes a computer-implemented method that includes: populating a metadata shell database with one or more hash values, wherein: each hash value corresponds to a verified installation of a database system, and the metadata shell database is maintained within a locked-down environment on an enterprise network; and monitoring metadata information of one or more database systems on the enterprise network based on periodically accessing metadata information of one or more database systems; and determining whether a database system on the enterprise network has been compromised based on a hash value of the metadata information of the database system and the one or more hash values from the metadata shell database.

20 Claims, 8 Drawing Sheets

(56) References Cited

U.S. PATENT DOCUMENTS

| | | | |
|---|---|---|---|
| 2007/0294205 A1* | 12/2007 | Xu | G06F 16/2255 |
| 2008/0281979 A1 | 11/2008 | Keeler | |
| 2013/0167236 A1 | 6/2013 | Sick | |
| 2014/0137237 A1* | 5/2014 | Robinson | G06F 16/283 |
| | | | 726/21 |
| 2014/0215196 A1* | 7/2014 | Berlin | G06F 21/575 |
| | | | 713/2 |
| 2014/0281578 A1* | 9/2014 | Bennison | H04L 9/3236 |
| | | | 713/189 |
| 2015/0163242 A1* | 6/2015 | Laidlaw | G06F 21/552 |
| | | | 726/22 |
| 2017/0116321 A1* | 4/2017 | Jain | G06F 16/27 |
| 2018/0131517 A1 | 5/2018 | Block et al. | |
| 2020/0162486 A1 | 5/2020 | Ranum et al. | |

OTHER PUBLICATIONS

PCT International Search Report and Written Opinion in International Appln. No. PCT/US2021/046859, dated Nov. 18, 2021, 14 pages.

* cited by examiner

METHOD TO DETECT DATABASE MANAGEMENT SYSTEM SQL CODE ANOMALIES

TECHNICAL FIELD

This disclosure generally relates to maintenance of database systems, and in particular, production database systems operated by a large enterprise.

BACKGROUND

A large enterprise can be an easy target for cybersecurity attacks. Securing database management systems of an enterprise can be mission critical to the daily operation of the enterprise.

SUMMARY

In one aspect, the present disclosure describes a computer-implemented method that includes: populating a metadata shell database with one or more hash values, wherein: each hash value corresponds to a verified installation of a database system, and the metadata shell database is maintained within a locked-down environment on an enterprise network; and monitoring metadata information of one or more database systems on the enterprise network based on periodically accessing metadata information of one or more database system; and determining whether a database system on the enterprise network has been compromised based on a hash value of the metadata information of the database system and the one or more hash values from the metadata shell database.

Implementations may include one or more of the following features.

The computer-implemented method may further include: computing a respective hash value of the metadata information of each of the one or more databases; and comparing the respective hash value with a hash value from the metadata shell database that corresponds to the verified installation of the database system. The computer-implemented method may further include: determining whether the hash value of the database system on the enterprise network matches the hash value from the metadata shell database that corresponds to the verified installation of the database system. The computer-implemented method may further include: in response to determining that the hash value of the database system on the enterprise network does not match the hash value from the metadata shell database that corresponds to the verified installation of the database system, determining that the database system on the enterprise network has been compromised. The computer-implemented method may further include: in response to determining that the database system on the enterprise network has been compromised, alerting a system administrator of the enterprise network.

Populating a metadata shell database with one or more hash values may include: accessing the metadata information of one or more database systems on the enterprise network; computing a respective hash value of the metadata information for each database system on the enterprise network; and populating the metadata shell database with the respective hash value for each database system on the enterprise network.

Populating a metadata shell database with one or more hash values may include: accessing a vendor repository for a list of hash values for the one or more database systems; and populating the metadata shell database with the list of hash values for each database system.

Populating a metadata shell database with one or more hash values may include: accessing metadata of a group of shell database systems that correspond to the one or more database systems, wherein a group of shell database systems are maintained within the locked-down environment on the enterprise network; computing a respective hash value of the metadata information for each database system from the group of shell database systems; and populating the metadata shell database with the respective hash value for each database system on the enterprise network. The group of shell database systems may be provisioned as container images. The container images may be patched periodically to synchronize with verified installations. The locked-down environment on the enterprise network may be enforced by a firewall and a whitelist.

In another aspect, the present disclosure describes a computer system comprising one or more processors, wherein the one or more processors are configured to perform operations of populating a metadata shell database with one or more hash values, wherein: each hash value corresponds to a verified installation of a database system, and the metadata shell database is maintained within a locked-down environment on an enterprise network; and monitoring metadata information of one or more database systems on the enterprise network based on periodically accessing metadata information of one or more database systems; and determining whether a database system on the enterprise network has been compromised based on a hash value of the metadata information of the database system and the one or more hash values from the metadata shell database.

Implementations may include one or more of the following features.

The operations may further include: computing a respective hash value of the metadata information of each of the one or more databases; and comparing the respective hash value with a hash value from the metadata shell database that corresponds to the verified installation of the database system. The operations may further include: determining whether the hash value of the database system on the enterprise network matches the hash value from the metadata shell database that corresponds to the verified installation of the database system. The operations may further include: in response to determining that the hash value of the database system on the enterprise network does not match the hash value from the metadata shell database that corresponds to the verified installation of the database system, determining that the database system on the enterprise network has been compromised. The operations may further include: in response to determining that the database system on the enterprise network has been compromised, alerting a system administrator of the enterprise network.

Populating a metadata shell database with one or more hash values may include: accessing the metadata information of one or more database systems on the enterprise network; computing a respective hash value of the metadata information for each database system on the enterprise network; and populating the metadata shell database with the respective hash value for each database system on the enterprise network.

Populating a metadata shell database with one or more hash values may include: accessing a vendor repository for a list of hash values for the one or more database systems; and populating the metadata shell database with the list of hash values for each database system.

Populating a metadata shell database with one or more hash values may include: accessing metadata of a group of shell database systems that correspond to the one or more database systems, wherein a group of shell database systems are maintained within the locked-down environment on the enterprise network; computing a respective hash value of the metadata information for each database system from the group of shell database systems; and populating the metadata shell database with the respective hash value for each database system on the enterprise network. The group of shell database systems may be provisioned as container images. The container images may be patched periodically to synchronize with verified installations. The locked-down environment on the enterprise network may be enforced by a firewall and a whitelist.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

Figure 1:
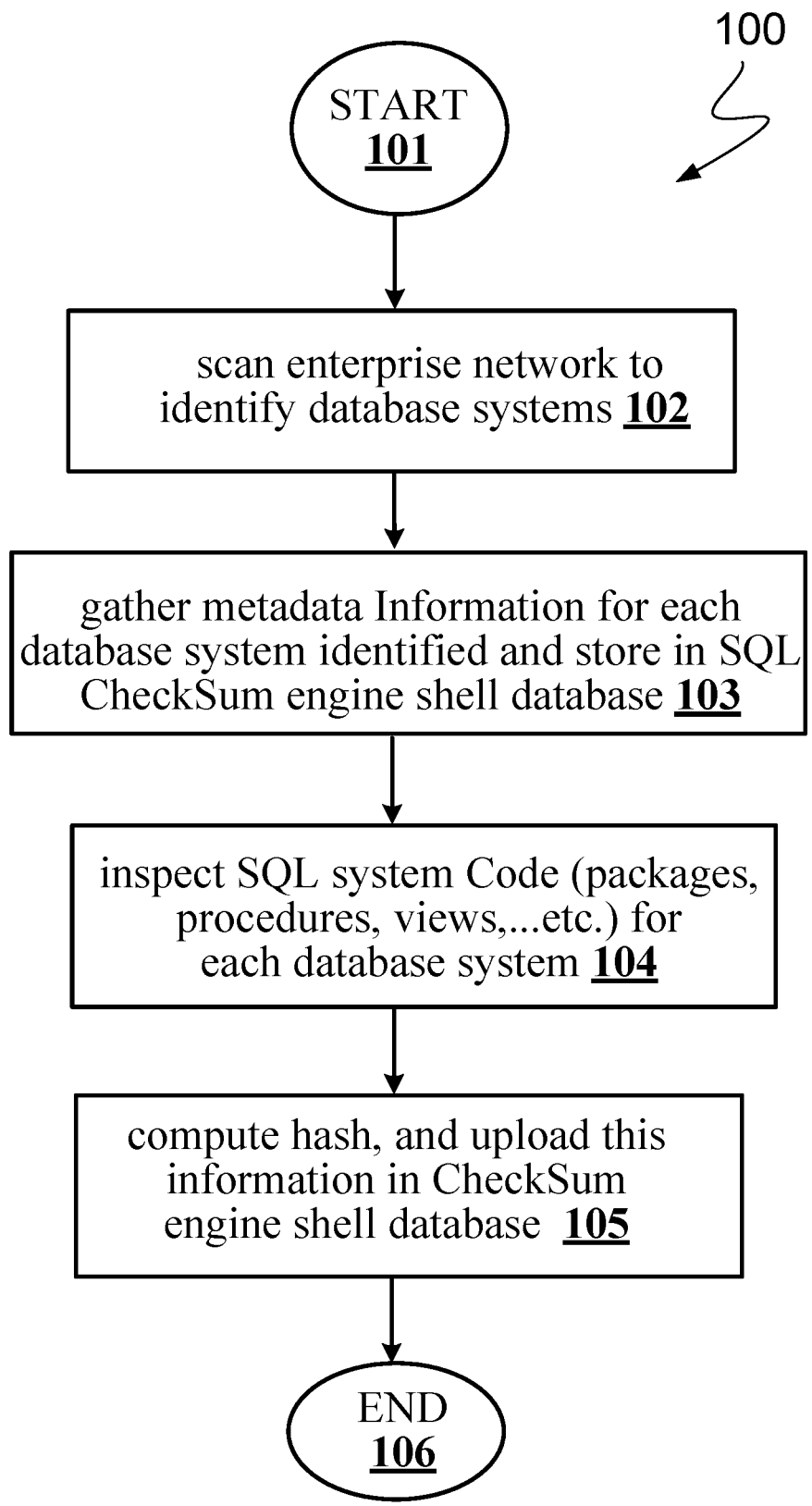
FIG. 1 illustrates an example of a flow chart according to an implementation of the present disclosure.

The disclosed technology is directed to securing database management systems that are becoming challenging as cybersecurity attack techniques are evolving. Indeed, such cybersecurity attacks are becoming more and more sophisticated. Tracing and detecting such attacks are becoming increasingly challenging. By way of example, one of the common cybersecurity attacks against a database system is a "rootkit" attack, which is a malicious software or code injected to perform undetected and harmful actions. In a database system, a rootkit attack, for example can lead to privilege escalation, data exfiltration, and persistence of unauthorized access.

The disclosed technology can provide a security threat detection methodology to detect SQL database system level code modifications. The methodology variably incorporates, for example, hash computation by calculating the SQL code hash value and then comparing the hash value with that of an intact shell database information, or official vendor hash values.

For example, the disclosed technology can include a SQL CheckSum engine as a software/application framework solution to detect database system dictionary SQL code modification, such as SQL code modification in packages, procedures, views, etc., in addition to application SQL stored code. In this example, the software system can initially perform a network scan of the enterprise infrastructure to uncover the database systems in operation. Subsequently, the software system may maintain a database account with permissions to access only metadata information for each database system being monitored.

Each database system scanned as part of the inventory are expected to have the metadata recorded in the SQL CheckSum engine shell database such as database version, patch release, operating system, IP address, the number of dictionary system code objects, and the hash value for each database object such as packages or views. Additionally, user-custom SQL code can be included in the monitoring.

In some implementations, the SQL CheckSum engine can be hosted in a locked-down isolated environment to enforce the protection and integrity of the system. For example, the locked-down isolated environment can be a restricted environment where firewalls and, whitelisting are in-place to preserve the "SQL checksum" so that the information may not be compromised from an outside attacker. In this example, the locked-down environment may include a dedicated storage sub-system to enforce data isolation from other systems on the enterprise network as well as the external network.

A malicious attacker attempting to tamper with the database system code dictionary will alter the underlying data, thereby creating an "anomaly" in the checksum. The anomaly can be detected by the SQL CheckSum engine, and reported to the system administrator. To eliminate false positives findings, the SQL CheckSum engine can tap in to the database vendor's publicly authenticated checksum (hash values) information when such information is provided or fetch the latest hashes from an external clean (that maintains integrity) and pre-created shell database that is not tampered with.

The framework of the present disclosure is applicable for database system code dictionary, and the application side of the SQL system code. For the application side SQL code stored in the database system with high permissions and privileges, such SQL code is likewise monitored against any modifications because rogue SQL code can also lead to security holes in the database that potentially lead to data ex-filtration, privilege elevation, and other security vulnerabilities.

Referring to FIG. 1, flow chart 100 shows an example of a workflow to enforce data integrity to thwart malicious attacks. After the workflow starts (101), the SQL CheckSum engine can scan the organization's network (102). Here, the SQL CheckSum engine may utilize a network port scan to determine database services operating at each port. In some implementations, the SQL CheckSum Engine can automatically detect databases hosted in the organization's infrastructure network through, for example, the transmission control protocol TCP. Alternatively or additionally, some implementations may allow the system administrator to manually list the databases, for example, through entering an IP address, port, to be included as part of the scan process.

The SQL CheckSum engine may then gather metadata information for each database system discovered and stored in SQL CheckSum engine shell (103). The metadata information may generally include, for example, system information, directory information, permission information, or other types of data that describes the content data. Notably, the metadata does not include the actual data contents of the SQL database.

The SQL CheckSum engine may then inspect SQL system code, including packages, procedures, and views, for each database system database uncovered (104). The packages, procedures, and views can be specific to an initial installation of the underlying SQL database.

The SQL CheckSum engine may then perform hashing and comparison to determine the integrity of, for example, the metadata; and this hash information can be uploaded in CheckSum engine shell database (105). The example of the workflow may then terminate (106).

In some implementations, the CheckSum engine may interact with the database system via a database account for authentication into each database listed in the inventory. In these examples, each database account is equipped with set of permissions that enables the SQL CheckSume engine to view the SQL source code of the database system dictionary in addition to application SQL source code. In these implementations, the CheckSum engine may parse the list of dictionary system code, perform a hashing algorithm on the dictionary system code and populate the computed hash value in the "SQL CheckSUM Metadata Shell Database." In these examples, the checkSUM engine may periodically scan the network of the enterprise to monitor the databases that are part of the inventory, perform hash computations for each database, and then compare the hash values to detect any illegal modifications/changes to the underlying database. Moreover, the CheckSum engine may also cross-check when a new database object such as a view, a procedure, or a package is introduced either under the database dictionary or as an application schema as this can be flagged as a malicious user attempting to inject a new SQL code in the database. In these scenarios, the CheckSum engine can be triggered to cross check with, for example, an isolated installation known as the baseline copy.

Figure 2:
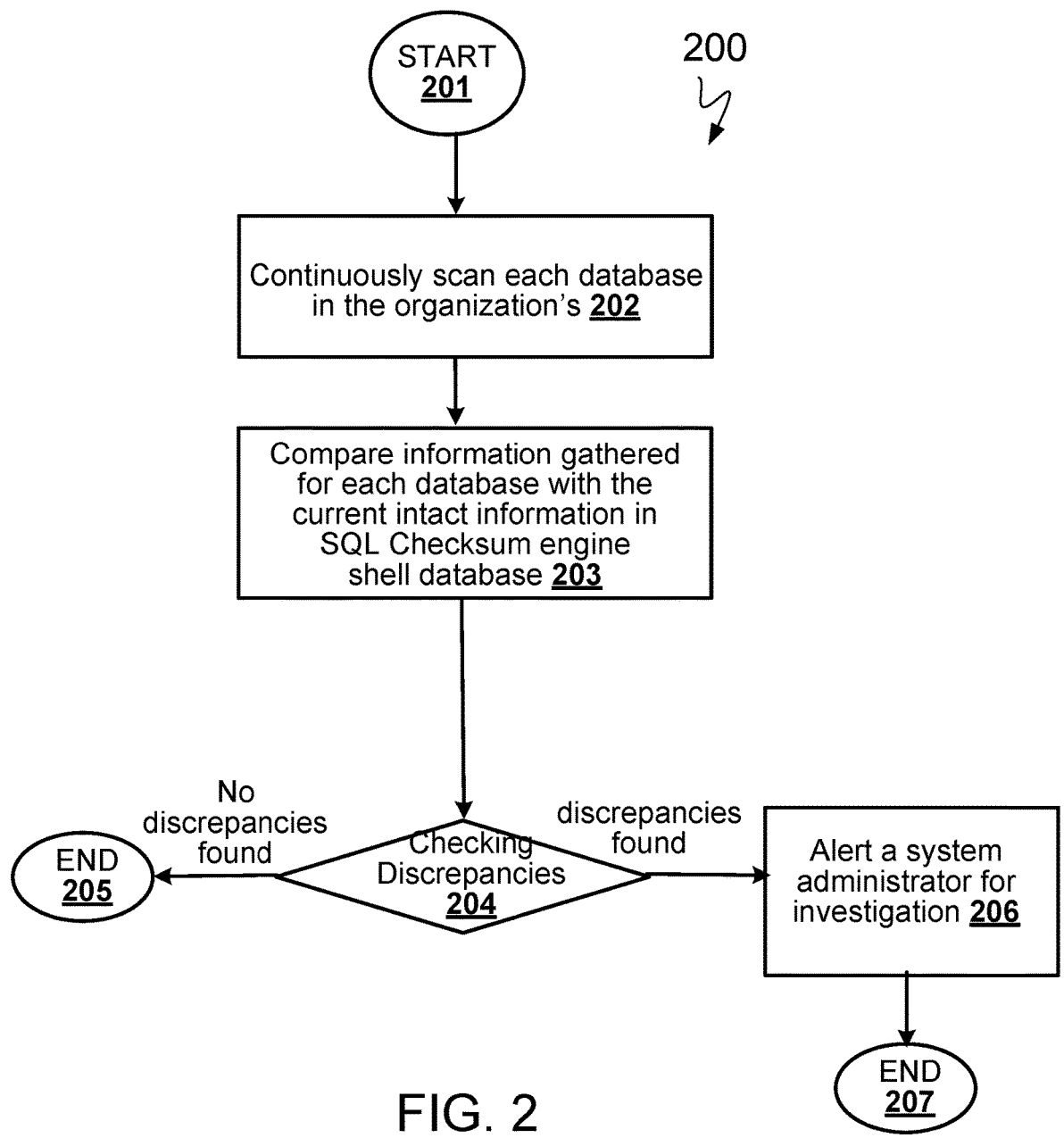
FIG. 2 illustrates another example of a flow chart according to an implementation of the present disclosure.

FIG. 2 illustrates another flowchart 200 showing an example of a workflow in accordance with some implementations. After initiation (201), the SQL CheckSum engine can continuously scan each database within the organization (202). For example, the SQL CheckSum engine can periodically perform a network scan on the enterprise network to identify the operational SQL databases, namely, the SQL databases configured to respond to user queries.

In some implementations, the CheckSum engine can compare information gathered for each database with the current intact information in the shell database of the SQL Checksum engine (203). Here, the CheckSum engine can login to an authorized account and then compute the hash of the system data of the corresponding database installation. The computed hash can be based on, for example, the metadata of the database installation. The hash value can then be compared with the data entry at the shell database of the SQL CheckSum engine.

The comparison allows a determination of whether a discrepancy exists (204). As discussed above, a discrepancy can correspond to an alteration of modification to the underlying installation of the database system. If no discrepancy is identified, the workflow can terminate (205). If a discrepancy has been identified, the CheckSum engine may automatically send an alert to, for example, a system administrator of the organization (206). In some cases, the alert can be provided with full information of the discrepancy. In these cases, the alert may prompt the system administrator to initiate a full investigation. In some cases, the alert may be provided through an internal messaging system to project an indication on a communication device of the system administrator. Here, the communication device can be a dedicated communication device and the indication may be accompanied by a link to an internal resource. The workflow can then terminate (207).

Figure 3A:
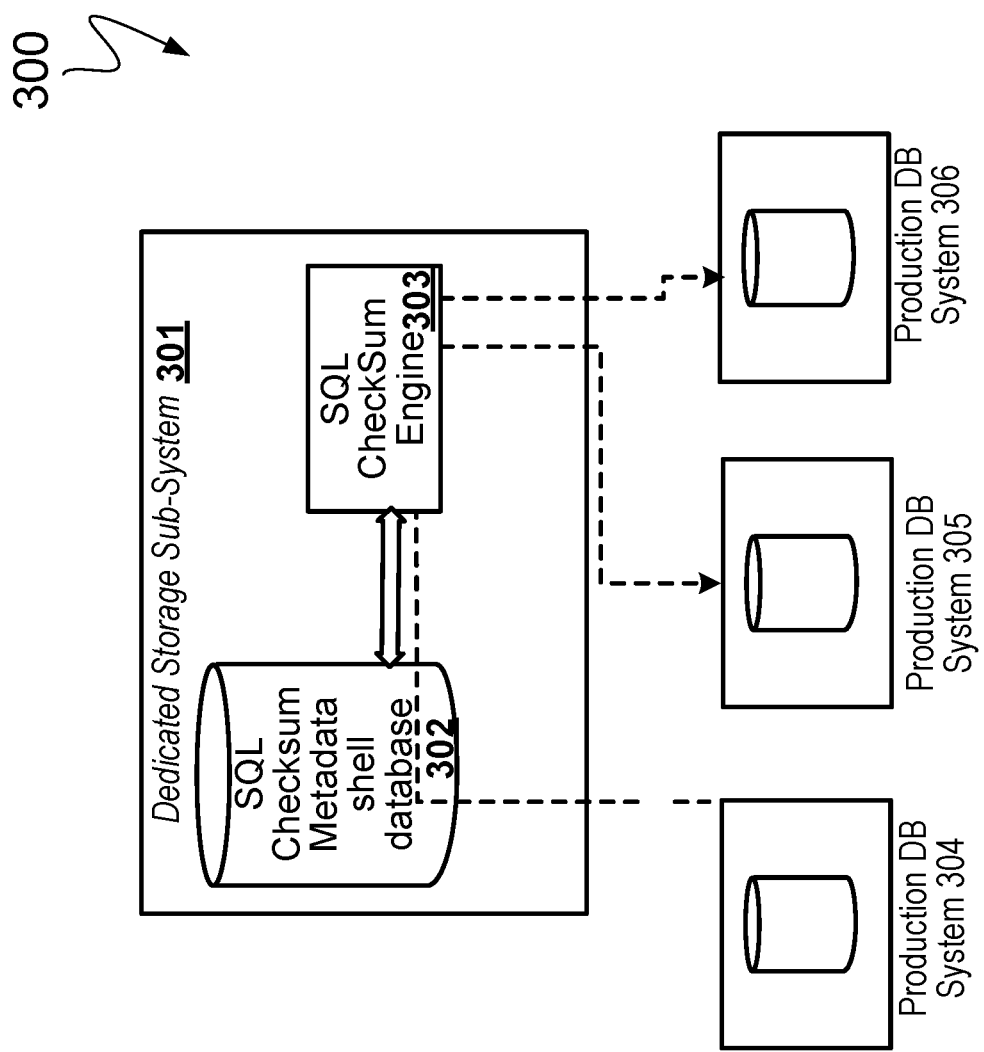
FIGS. 3A and 3B illustrate examples of system diagrams according to an implementation of the present disclosure.

In various implementations, the hashes of the verified SQL codes can be either taken from a reliable verified source hash as database vendor repository, or from a group of shell databases (no-user data) with different versions/releases/patches applied. Further referring to FIG. 3A illustrating a diagram 300, SQL CheckSum engine 303 may reside on a dedicated storage sub-system 301 that also houses SQL CheckSum metadata shell database 302. Here, the dedicated storage subsystem is placed in an isolated locked-down environment to maintain security & integrity. In some case, the lock-down restricted environment is a restricted environment where firewalls and whitelisting are in-place to ensure "SQL checksum" engine is safe and not compromised from an outside attacker. From within this lock-down environment, SQL CheckSum engine 303 performs a network scan for database discovery and inspection on, for example, production database systems 304, 305, and 306. This scan and follow-up queries can populate the SQL CheckSum metadata shell database 302 with hash values of each installation of the operational database system on the enterprise network. The table of the established hash values provide a snapshot of the baseline and clean system installation. This table can be used for monitoring purposes.

Figure 3B:
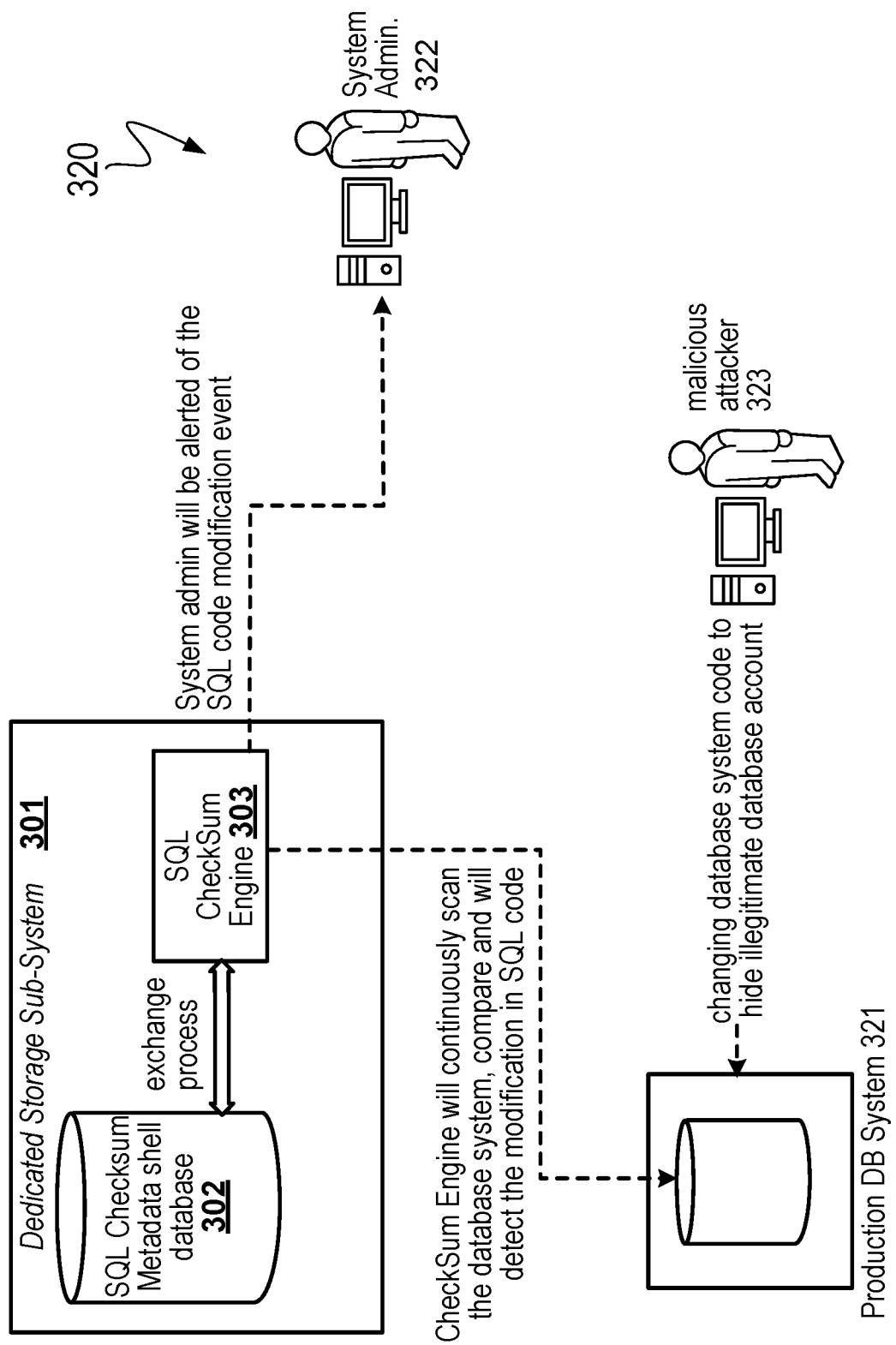

Further referring to FIG. 3B illustrating another diagram 320, SQL CheckSum engine 303 will continuously scan the enterprise network to monitor the installations of the operational database systems. For example, the SQL CheckSum engine 303 can repeatedly and periodically query production database system 321 and compute a hash value of, for example, the metadata of the system installation. In some cases, the CheckSum engine 303 can leverage a dedicated account on the production database system 321 to perform the inspection and computation. When a malicious attacker 323 invades the production database system 321 to change system data, the database system 321 will experience changes to, for example, the metadata of the installation, even though the intruder may attempt to hide the illegitimate access. This alteration will lead to differences in the hash value. In other words, by monitoring the hash value periodically and comparing the hash value to a snapshot of the baseline, as stored at, for example, SQL CheckSum metadata shell database and accessed via the exchange process, implementations can detect minute changes to the underlying database installation. For example, if the hash value of a SQL system code such as system view called all_db_users does not match any of the databases hash values this indicates that the view SQL code has been illegally manipulated. When such discrepancies are detected, an alert can be sent to the system administrator 322 to indicate that the underlying installation of a particular database system may have been compromised.

Figure 4A:
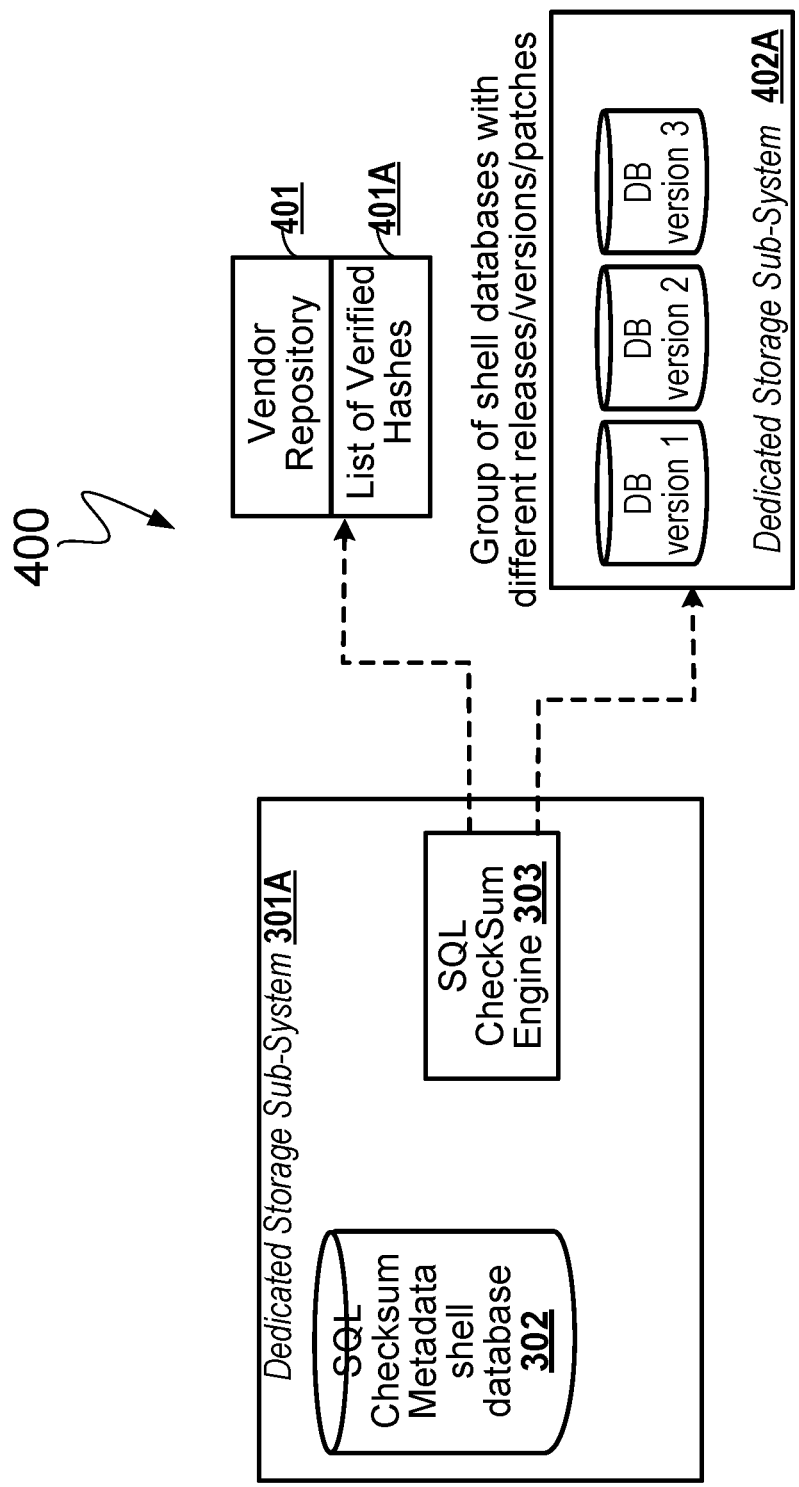
FIGS. 4A and 4B illustrate examples of system diagrams according to an implementation of the present disclosure.

In addition to the storing hash values of the initial installation, some implementations may leverage vendor provided information of the underlying database installation. In these cases, the CheckSUM engine can tap into the latest verified hashes from external resources (vendor repository) or a dedicated group of clean shell databases. Further referring to FIG. 4A illustrating a diagram 400, SQL CheckSum engine 303 may reside on a dedicated storage sub-system 301A that also houses SQL CheckSum metadata shell database 302 in an isolated locked-down environment to maintain security & integrity. From within this lock-down environment, SQL CheckSum engine 303 queries vendor repository 401 for a listing of verified hashes 401A of the underlying database installations, as provided by the vendor. Additionally or alternatively, the SQL CheckSum engine 303 can also query a group of shell database installations (e.g., database versions 1 to 3) maintained on a dedicated storage sub-system 402A to obtain a snapshot of the baseline system. Here, the information of the database system shells are likewise kept in a lock-down environment with, for example, firewall and whitelisting enforcement to ensure data integrity. The information of the database system shells can include various releases, versions, and patches of an underlying database installation. In some cases, this group of shell database systems are provisioned as container images. In these cases, the container images are patched periodically to synchronize with verified installations. This information gathering can populate SQL CheckSUM metadata shell database 302 as lookup tables for comparison.

Figure 4B:
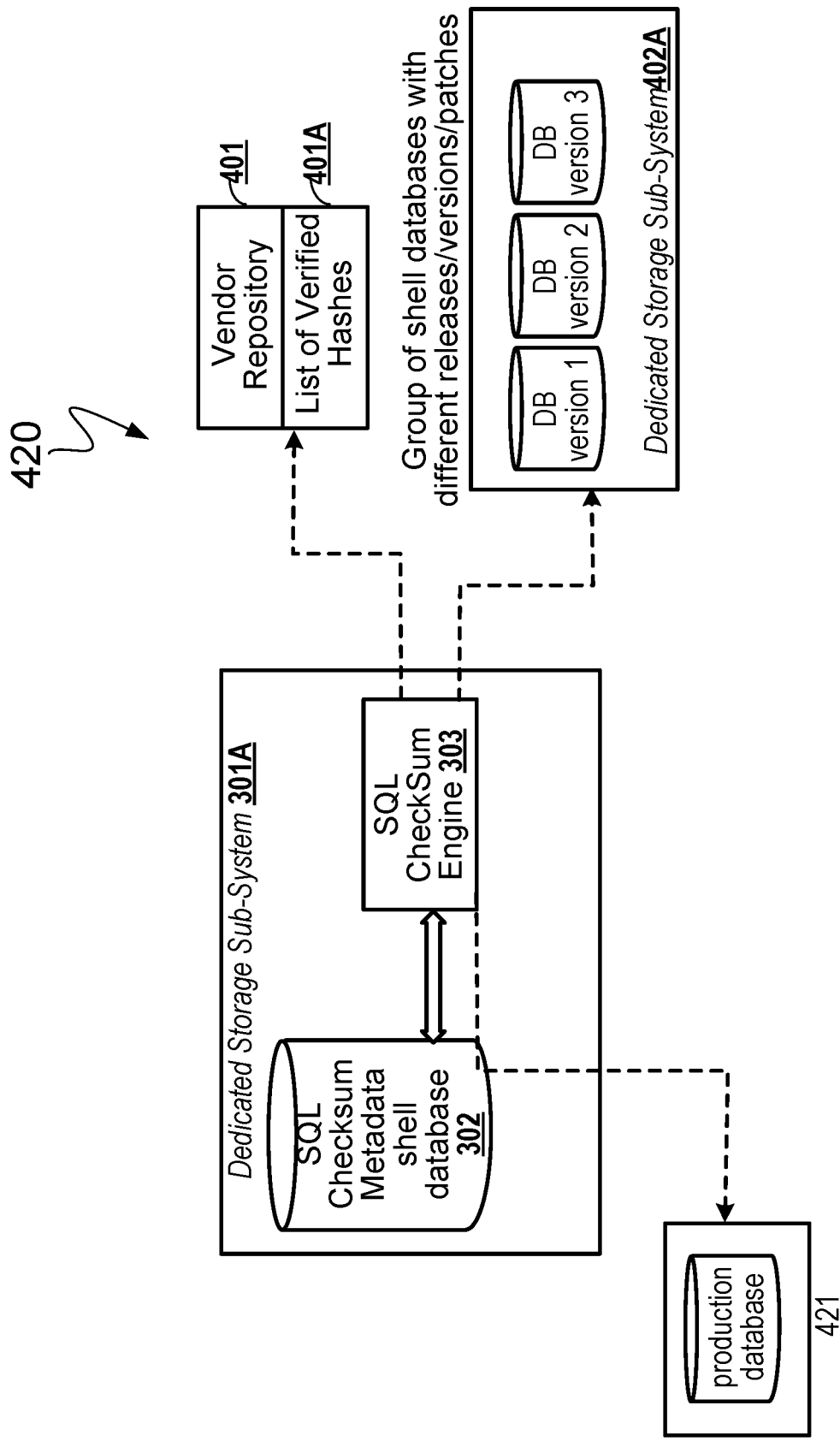

Further referring to FIG. 4B illustrating a diagram 420, SQL CheckSum engine 303 may continuously scan the enterprise network to monitor the installations of the production database systems including, for example, production database 421. For example, the SQL CheckSum engine 303 can repeatedly and periodically query production database system 421 and compute a hash value of, for example, the metadata of the system installation. As discussed above, even a minute change of the underlying system data will lead to differences in the hash value. Indeed, by monitoring the hash value periodically and comparing the hash value to reference values stored at, for example, the SQL CheckSum metadata shell database and accessed via the exchange process, implementations can detect minute changes to the underlying database installation. When such discrepancies are detected, an alert can be sent to the system administrator 320 to indicate that the underlying installation of a particular database system may have been compromised.

Figure 5:
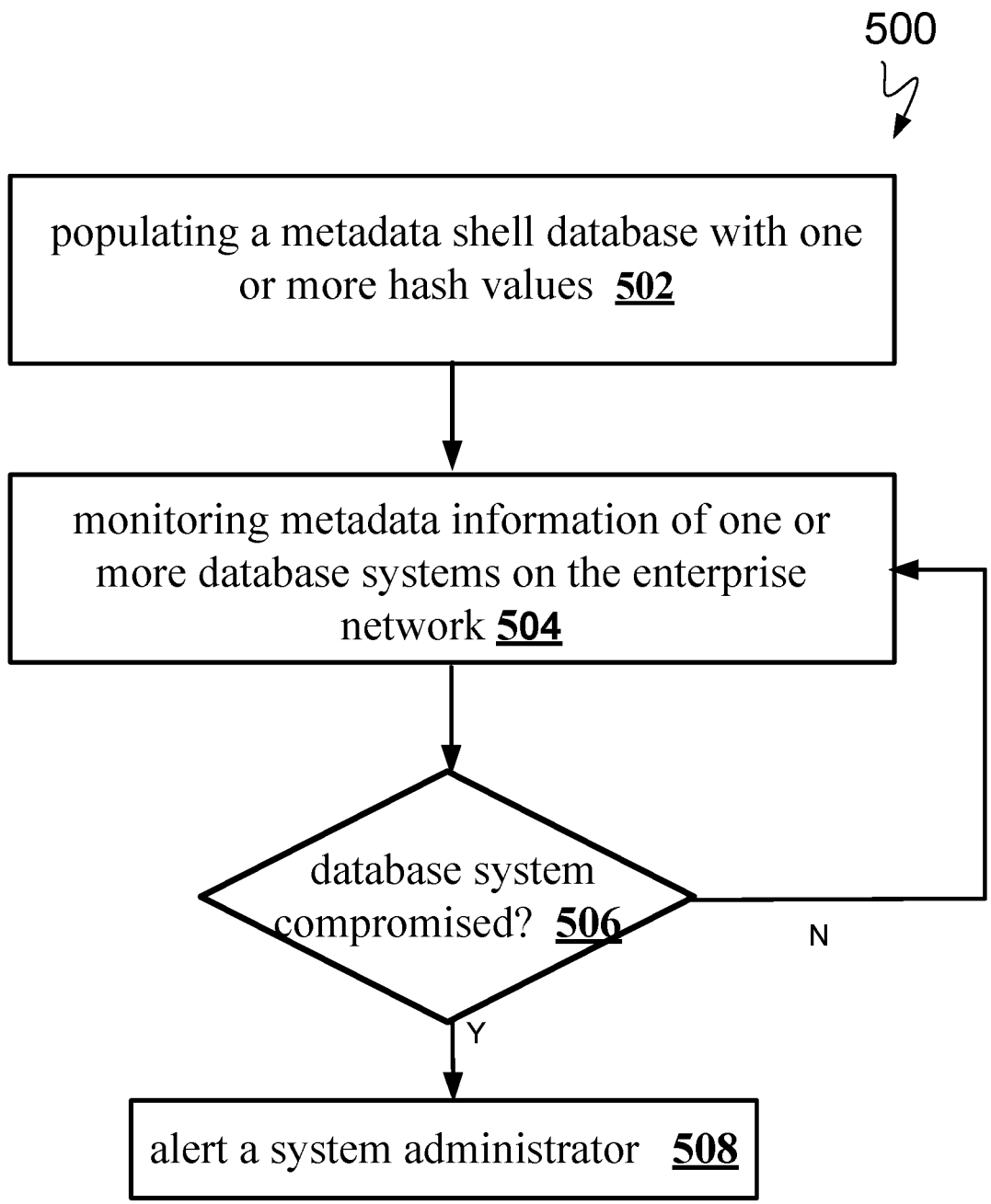
FIG. 5 illustrates an example of a flow chart according to an implementation of the present disclosure.

FIG. 5 is a flow chart 500 showing an example of a process according to some implementations. The process populates a metadata shell database with one or more hash values (502). Each hash value corresponds to a verified installation of a database system. The metadata shell database is maintained within a locked-down environment on an enterprise network. The locked-down environment on the enterprise network can be enforced by a firewall and a whitelist. The metadata shell database can be populated based on a list of hash values of verified database installations as provided by the vendor. Alternatively or additionally, the metadata shell database can be populated based on computing hash values of a group of dedicated shell database system installations that are likewise kept in a lock-down environment. Here, the group of dedicated shell database system installations can be provisioned as container images, which can be patched periodically and regularly to, for example, stay in sync with the most current releases. Alternatively or additionally, the metadata shell database can be populated based on an initial network scan of the production database systems on the enterprise network to create a snapshot of the hash values of the production database systems as the baseline or clean versions.

The process may then monitor metadata information of one or more database systems on the enterprise network based on periodically accessing metadata information of one or more database systems (504). In some implementations, the process may compute a respective hash value of the metadata information of each of the one or more databases; and then compare the respective hash value with a hash value from the metadata shell database that corresponds to the verified installation of the database system. In these implementations, the process may determine whether the hash value of the database system on the enterprise network matches the hash value from the metadata shell database that corresponds to the verified installation of the database system.

The process may then determine whether a database system on the enterprise network has been compromised (506). In some implementations, the determination is based on a hash value of the metadata information of the database system and the one or more hash values from the metadata shell database. In these implementations, in response to determining that the hash value of the database system on the enterprise network matches the hash value from the metadata shell database that corresponds to the verified installation of the database system, the process may determine that the database system has not been comprised and continue monitoring of the metadata information of the production database systems (504).

In these implementations, in response to determining that the hash value of the database system on the enterprise network does not match the hash value from the metadata shell database that corresponds to the verified installation of the database system, the process may determine that the database system has been comprised and proceed to alert a system administrator (508). For example, the system administrator may be alerted on an internal and instant messaging system to start an investigation of the incident.

Figure 6:
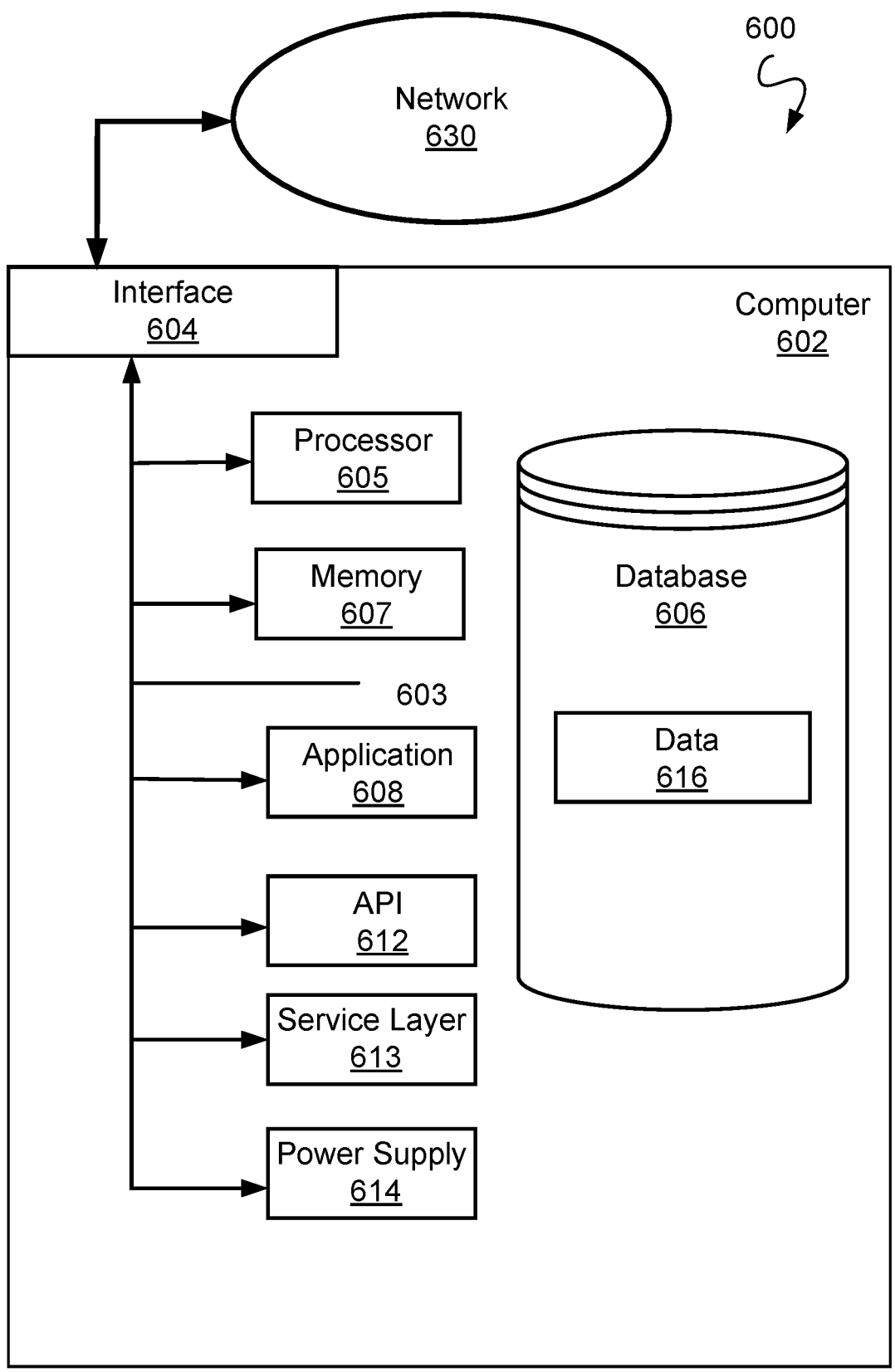
FIG. 6 is a block diagram illustrating an example of a computer system used to provide computational functionalities associated with described algorithms, methods, functions, processes, flows, and procedures, according to an implementation of the present disclosure.

FIG. 6 is a block diagram illustrating an example of a computer system 600 used to provide computational functionalities associated with described algorithms, methods, functions, processes, flows, and procedures, according to an implementation of the present disclosure. The illustrated computer 602 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 602 can comprise a computer that includes an input device, such as a keypad, keyboard, touch screen, another input device, or a combination of input devices that can accept user information, and an output device that conveys information associated with the operation of the computer 602, including digital data, visual, audio, another type of information, or a combination of types of information, on a graphical-type user interface (UI) (or GUI) or other UI.

The computer 602 can serve a role in a computer system as a client, network component, a server, a database or another persistency, another role, or a combination of roles for performing the subject matter described in the present disclosure. The illustrated computer 602 is communicably coupled with a network 630. In some implementations, one or more components of the computer 602 can be configured to operate within an environment, including cloud-computing-based, local, global, another environment, or a combination of environments.

The computer 602 is an electronic computing device operable to receive, transmit, process, store, or manage data and information associated with the described subject matter. According to some implementations, the computer 602 can also include or be communicably coupled with a server, including an application server, e-mail server, web server, caching server, streaming data server, another server, or a combination of servers.

The computer 602 can receive requests over network 630 (for example, from a client software application executing on another computer 602) and respond to the received requests by processing the received requests using a software application or a combination of software applications. In addition, requests can also be sent to the computer 602 from internal users, external or third-parties, or other entities, individuals, systems, or computers.

Each of the components of the computer 602 can communicate using a system bus 603. In some implementations, any or all of the components of the computer 602, including hardware, software, or a combination of hardware and software, can interface over the system bus 603 using an application programming interface (API) 612, a service layer 613, or a combination of the API 612 and service layer 613. The API 612 can include specifications for routines, data structures, and object classes. The API 612 can be either computer-language independent or dependent and refer to a complete interface, a single function, or even a set of APIs. The service layer 613 provides software services to the computer 602 or other components (whether illustrated or not) that are communicably coupled to the computer 602. The functionality of the computer 602 can be accessible for all service consumers using this service layer. Software services, such as those provided by the service layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 602, alternative implementations can illustrate the API 612 or the service layer 613 as stand-alone components in relation to other components of the computer 602 or other components (whether illustrated or not) that are communicably coupled to the computer 602. Moreover, any or all parts of the API 612 or the service layer 613 can be implemented as a child or a sub-module of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602. The interface 604 is used by the computer 602 for communicating with another computing system (whether illustrated or not) that is communicatively linked to the network 630 in a distributed environment. Generally, the interface 604 is operable to communicate with the network 630 and comprises logic encoded in software, hardware, or a combination of software and hardware. More specifically, the interface 604 can comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors can be used according to particular needs, desires, or particular implementations of the computer 602. Generally, the processor 605 executes instructions and manipulates data to perform the operations of the computer 602 and any algorithms, methods, functions, processes, flows, and procedures as described in the present disclosure.

The computer 602 also includes a database 606 that can hold data for the computer 602, another component communicatively linked to the network 630 (whether illustrated or not), or a combination of the computer 602 and another component. For example, database 606 can be an in-memory, conventional, or another type of database storing data consistent with the present disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases of similar or differing types can be used according to particular needs, desires, or particular implementations of the computer 602 and the described functionality. While database 606 is illustrated as an integral component of the computer 602, in alternative implementations, database 606 can be external to the computer 602. As illustrated, the database 606 holds the previously described data 616 including, for example, the table tabulating hash values of the known installations of database systems used in the enterprise network.

The computer 602 also includes a memory 607 that can hold data for the computer 602, another component or components communicatively linked to the network 630 (whether illustrated or not), or a combination of the computer 602 and another component. Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 or similar or differing types can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in the present disclosure. For example, application 608 can serve as one or more components, modules, or applications. Further, although illustrated as a single application 608, the application 608 can be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or another power management functionality). In some implementations, the power-supply 614 can include a power plug to allow the computer 602 to be plugged into a wall socket or another power source to, for example, power the computer 602 or recharge a rechargeable battery.

There can be any number of computers 602 associated with, or external to, a computer system containing computer 602, each computer 602 communicating over network 630. Further, the term "client," "user," or other appropriate terminology can be used interchangeably, as appropriate, without departing from the scope of the present disclosure. Moreover, the present disclosure contemplates that many users can use one computer 602, or that one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from a memory and write to the memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/-R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
   scanning an enterprise network for a plurality of database systems thereon;
   populating a metadata shell database for the plurality of database systems with hash values, wherein:
      each hash value corresponds to a database system from the plurality of database systems and comprises a metadata hash of a verified installation of the corresponding database system, and
      the metadata shell database is maintained for the plurality of database systems within a locked-down environment on the enterprise network; and
   monitoring metadata information of the plurality of database systems on the enterprise network based on periodically accessing metadata information of the plurality of database systems; and
   determining whether a database system on the enterprise network has been compromised based on a hash value of the periodically accessed metadata information of the database system and hash values from the metadata shell database.

2. The computer-implemented method of claim 1, further comprising:
   computing a respective hash value of the metadata information of each of the plurality of database systems; and
   comparing the respective hash value with a hash value from the metadata shell database.

3. The computer-implemented method of claim 2, further comprising:
   determining whether the respective hash value matches the hash value from the metadata shell database that comprises the metadata hash of the verified installation of the corresponding database system.

4. The computer-implemented method of claim 3, further comprising:
   in response to determining that the respective hash value does not match the hash value from the metadata shell database that comprises the metadata hash of the verified installation of the corresponding database system, determining that the database system on the enterprise network has been compromised.

5. The computer-implemented method of claim 4, further comprising:
   in response to determining that the database system on the enterprise network has been compromised, alerting a system administrator of the enterprise network.

6. The computer-implemented method of claim 1, wherein populating a metadata shell database with hash values comprises:
   accessing the metadata information of the plurality of database systems on the enterprise network;
   computing a respective hash value of the metadata information for each database system on the enterprise network; and
   populating the metadata shell database with the respective hash value for each database system on the enterprise network.

7. The computer-implemented method of claim 1, wherein populating a metadata shell database with hash values comprises:
   accessing a vendor repository for a list of hash values for the plurality of database systems; and
   populating the metadata shell database with the list of hash values for each database systems.

8. The computer-implemented method of claim 1, wherein populating a metadata shell database with hash values comprises:
   accessing metadata of a group of shell database systems that correspond to the plurality of database systems, wherein a group of shell database systems are maintained within the locked-down environment on the enterprise network;
   computing a respective hash value of the metadata information for each database system from the group of shell database systems; and
   populating the metadata shell database with the respective hash value for each database system on the enterprise network.

9. The computer-implemented method of claim 8, wherein the group of shell database systems are provisioned as container images, and wherein the container images are patched periodically to synchronize with verified installations.

10. The computer-implemented method of claim 1, wherein the locked-down environment on the enterprise network is enforced by a firewall or a whitelist.

11. A computer system comprising one or more processors, wherein the one or more processors are configured to perform operations of:
    scanning an enterprise network for a plurality of database systems thereon;
    populating a metadata shell database for the plurality of database systems with one or more hash values, wherein:
       each hash value corresponds to a database system from the plurality of database systems and comprises a metadata hash of a verified installation of the corresponding database system, and
       the metadata shell database for the plurality of database systems within a locked-down environment on the enterprise network; and
    monitoring metadata information of the plurality of database systems on the enterprise network based on periodically accessing metadata information of the plurality of database systems; and
    determining whether a database system on the enterprise network has been compromised based on a hash value of the periodically accessed metadata information of the database system and hash values from the metadata shell database.

12. The computer system of claim 11, wherein the operations further comprise:
    computing a respective hash value of the metadata information of each of the plurality of database systems; and
    comparing the respective hash value with a hash value from the metadata shell database.

13. The computer system of claim 12, wherein the operations further comprise:
    determining whether the respective hash value matches the hash value from the metadata shell database that comprises the metadata hash of the verified installation of the corresponding database system.

14. The computer system of claim 13, wherein the operations further comprise:
in response to determining that the respective hash value does not match the hash value from the metadata shell database that comprises the metadata hash of the verified installation of the corresponding database system, determining that the database system on the enterprise network has been compromised.

15. The computer system of claim 14, wherein the operations further comprise:
in response to determining that the database system on the enterprise network has been compromised, alerting a system administrator of the enterprise network.

16. The computer system of claim 11, wherein populating a metadata shell database with one or more hash values comprises:
accessing the metadata information of the plurality of database systems on the enterprise network;
computing a respective hash value of the metadata information for each database system on the enterprise network; and
populating the metadata shell database with the respective hash value for each database system on the enterprise network.

17. The computer system of claim 11, wherein populating a metadata shell database with hash values comprises:
accessing a vendor repository for a list of hash values for the plurality of database systems; and
populating the metadata shell database with the list of hash values for each database systems.

18. The computer system of claim 11, wherein populating a metadata shell database with hash values comprises:
accessing metadata of a group of shell database systems that correspond to the plurality of database systems, wherein a group of shell database systems are maintained within the locked-down environment on the enterprise network;
computing a respective hash value of the metadata information for each database system from the group of shell database systems; and
populating the metadata shell database with the respective hash value for each database system on the enterprise network.

19. The computer system of claim 18, wherein the group of shell database systems are provisioned as container images, and wherein the container images are patched periodically to synchronize with verified installations.

20. The computer system of claim 11, wherein the locked-down environment on the enterprise network is enforced by a firewall or a whitelist.

* * * * *

UNITED STATES PATENT AND TRADEMARK OFFICE
CERTIFICATE OF CORRECTION

PATENT NO. : 11,601,446 B2
APPLICATION NO. : 16/998846
DATED : March 7, 2023
INVENTOR(S) : Emad Mohammad Al-Mousa It is certified that error appears in the above-identified patent and that said Letters Patent is hereby corrected as shown below:

In the Claims

Column 16, Claim 11, Line 38, delete "thereon:" and insert -- thereon; --

Signed and Sealed this
Eighteenth Day of April, 2023

Katherine Kelly Vidal
*Director of the United States Patent and Trademark Office*